Feb. 24, 1953        A. R. CURIONI        2,629,501
TRANSFERRING AND DISPENSING APPARATUS AND METHOD
Filed May 17, 1948
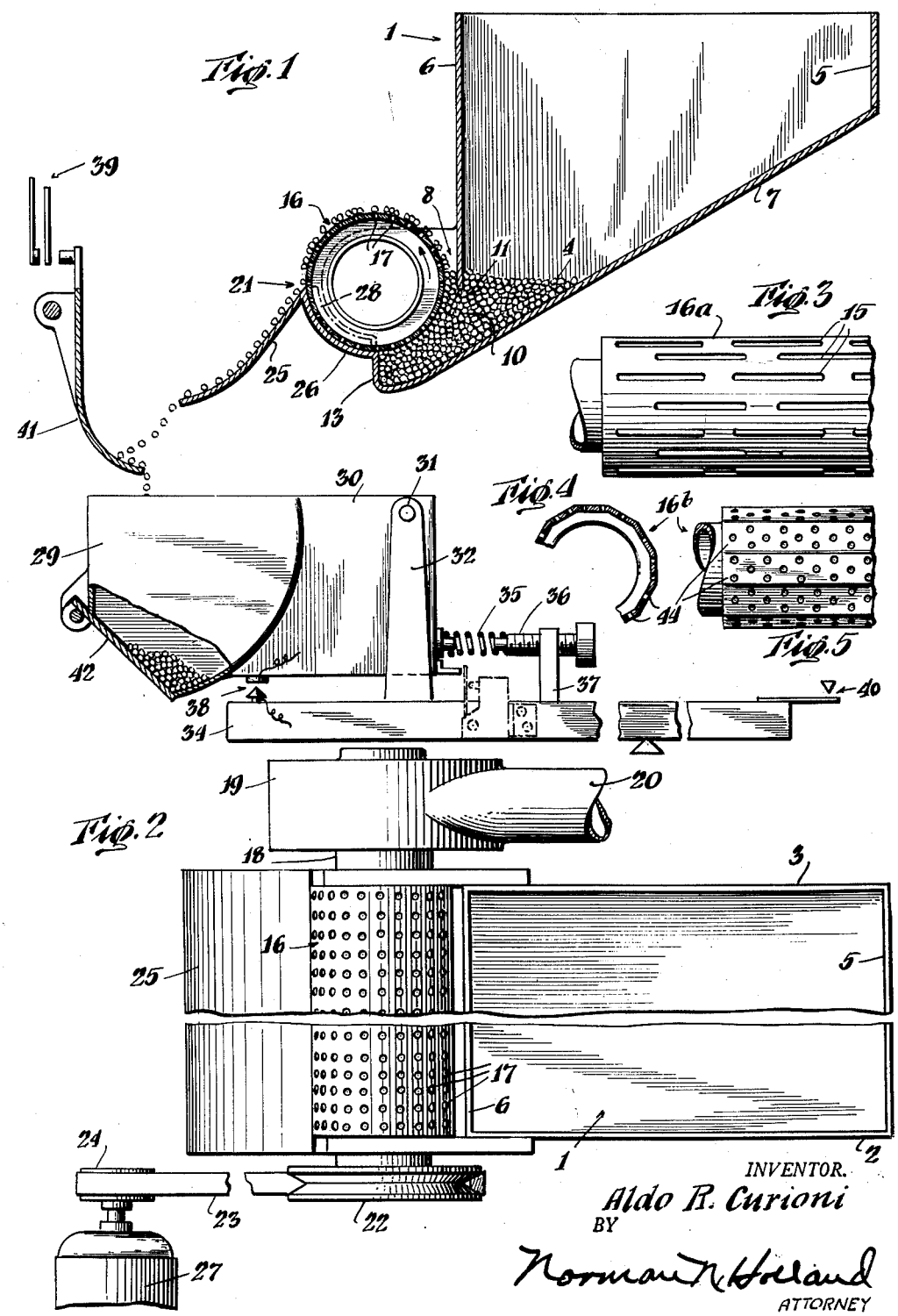
INVENTOR.
*Aldo R. Curioni*
BY
*Norman N. Holland*
ATTORNEY Patented Feb. 24, 1953

2,629,501

UNITED STATES PATENT OFFICE 2,629,501

TRANSFERRING AND DISPENSING APPARATUS AND METHOD

Aldo R. Curioni, New York, N. Y., assignor to Sarioni Company, Inc., New York, N. Y., a corporation of New York Application May 17, 1948, Serial No. 27,579

5 Claims. (Cl. 214—2)

The present invention relates to an apparatus or device and a method for transferring and dispensing articles, and more particularly to a device for transferring articles such as sticks of macaroni, spaghetti or vermicelli from a hopper to a measuring means.

In the packaging of food products, it is desirable that each individual package conform closely to the exact weight of the product which it is desired to sell in the individual package. If slightly less than the exactly correct weight of material is placed in the package, the packer, in addition to incurring the ill will of the purchaser, is liable to prosecution for violation of various weight requirements and laws. If slightly more than the correct weight is included in each package, there is a financial loss incurred by the packer or manufacturer which may, over periods of time, be considerable.

In connection with the presentation of articles or materials to a measuring or dispensing mechanism, it is desirable that the articles to be packaged be delivered to the measuring or dispensing means in a thin or gentle stream; such a stream provides a gradual increase in the quantity of articles being measured out for a particular package, and facilitates closer or more accurate control of the quantity of articles being fed. Where the articles or materials to be packaged are of a relatively compact nature, such as elbows, shells, peas or beans, delivery to a dispensing means is facilitated since the articles may be received, transferred and packed in helter-skelter arrangement. With relatively long, slender stick-like materials, such as spaghetti, macaroni or vermicelli, the problem is complicated since the individual pieces must be removed from a source of supply, transferred, and delivered to a measuring means while in substantially parallel relationship. Such sticks are relatively delicate and should not be subjected to rough treatment or abuse, as they are likely to break into small pieces and objectionably affect the good will of the manufacturer, packer or distributor; even though housewives may later break the sticks into smaller pieces, they dislike to purchase packages of macaroni or the like only to find that the sticks have been previously smashed into small pieces.

The present invention aims to provide a new and improved device or apparatus and method which may be utilized for arranging stick-like articles substantially into parallelism, removing them from a hopper in parallel arrangement, and forming the articles into a stream for delivery to a measuring means. The invention further contemplates the provision of a new and improved means and method for controlling the quantity of articles being delivered to a measuring or weighing means.

An object of the present invention is to provide a new and improved means and method for arranging articles and transferring them to a measuring means.

Another object of the invention is to provide new and improved means for holding slender, stick-like articles and transferring them in a substantially parallel relationship.

Another object of the invention is to provide new and improved means for removing articles from a mass and forming them into a thin or gentle stream.

Another object is to provide new and improved means and method for controlling the quantity output of a device for forming articles into a stream.

A further object is to provide new and improved means and method for selectively determining the duration of a period during which an article transferring means moves an article stream of reduced size.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention and various modifications thereof have been chosen for purposes of illustration and description. The preferred embodiment and the modifications are not intended to be exhaustive nor to limit the invention to the precise forms disclosed. They are chosen and described in order to best explain the principles of the invention and their application in practical use to thereby enable others skilled in the art to best utilize the invention in various embodiments and modifications as are best adapted to the particular use contemplated.

In the accompanying drawings,

Fig. 1 is a side view, partly in section and partly broken away, showing a preferred embodiment of the invention;

Fig. 2 is a top plan view, partly broken away, showing a portion of the embodiment illustrated in Fig. 1;

Fig. 3 is a fragmentary view showing a transferring cylinder provided with elongate openings;

Fig. 4 is a sectional view illustrating another form of transfer cylinder; and

Fig. 5 is a fragmentary plan view of the cylinder illustrated in Fig. 4.

Referring more particularly to Figs. 1 and 2 of the drawings, there is shown a supply hopper or container 1 having oppositely disposed side walls 2 and 3, end walls 5 and 6, and a bottom wall 7. The forward end wall 6 is shown spaced from the bottom wall 7 to form a discharge opening 10 through which articles or material may pass out of the hopper 1. The wall 6 may be movably mounted, if desired, in any suitable manner so that the spacing of the lower end 11 of the wall from the bottom wall 7 of the hopper may be varied to thereby vary the size of the discharge opening 10.

The hopper bottom wall 7 is shown downwardly inclined toward the exit or discharge opening 10 and provided with an end portion or projection which extends outwardly beyond the end wall 6 of the hopper so as to support and guide articles from the hopper through the discharge opening 10 and to support them beyond the outer surface of the end wall 6. An upwardly extending wall portion 13 forms a stop wall against which articles 4 may rest. The bottom wall 7 of the hopper may, if desired, be mounted for longitudinal oscillation to thereby facilitate movement of articles from the hopper toward the discharge opening 10; in the latter instance, the upright stop wall portion 13 may be of a flexible material to facilitate the oscillatory movement of the bottom wall 7. The lower wall 7 may be subjected to vibration, if desired, to facilitate movement of articles toward the discharge opening 10.

Macaroni or other materials contained within the hopper 1 move downwardly along the inclined surface of the bottom wall 7 toward and through the discharge opening 10, being restrained against lateral movement by the upwardly extending hopper side walls 2 and 3.

The major portion of the opening intermediate the bottom edge 11 of the end wall 6 and the lower wall 7 of the hopper is shown closed by a hollow and rotatable cylinder-like structure 16 which extends transversely across the elongate hopper opening. Upon rotation of the cylinder 16 and withdrawal of air therefrom, articles adjacent the exterior surface of the cylinder are held by suction against the cylinder surface and are picked up and transferred away from the hopper 1, as will be more fully described hereinafter. It will be noted that the cylinder 16 is shown spaced slightly from the hopper end wall 6 so that articles may be moved upwardly from the article mass with the cylinder through the space 8 between the end wall 6 and the surface of the rotating cylinder. While the cylinder-like structure will, for purposes of convenience, be generally referred to herein as a "cylinder," it is to be understood that there is no intention of limiting the structure to a precisely cylindrical shape.

As shown in Figs. 1 and 2, the cylinder is hollow and has a substantially circular outer casing provided with a plurality of perforations, openings or apertures 17 the perforations being located both around the circumference of the cylinder and lengthwise of it. At least some of the perforations are substantially in alignment lengthwise of the cylinder (Fig. 2). Air is shown withdrawn from the interior of the cylinder 16, and into the cylinder through the perforations 17, by an exhaust blower, fan or impeller contained within a housing 19, the housing being suitably connected with the cylinder 16 by a duct 18. From the housing 19 the air is discharged through an exhaust conduit 20.

Rotation of the cylinder 16 may be achieved by an electric motor 27 through a pulley 22 operatively connected with the cylinder 16, drive belt 23 and pulley 24. Any other suitable means may be provided for rotating the cylinder 16.

In operation, the cylinder 16 rotates to move the perforated surface thereof past the mass of articles 4 resting at the discharge opening of the hopper 1 and against the surface of the cylinder; air is meanwhile withdrawn from within the interior of the cylinder. The withdrawal of air from the interior of the cylinder sucks additional air from the atmosphere inwardly through the perforations or openings provided in the cylinder. The perforations or openings extend outwardly to the outer surface or periphery of the cylinder, and as they move through and out of the article mass 4 the resulting suction or partial vacuum is effective to pick articles out of the mass, hold them against the cylinder, and move them away from the mass 4 toward a release position 21.

Where relatively short sticks of macaroni or the like are supplied to the hopper 1, the suction applied through one or more of the perforations in the surface of the cylinder 16 may be effective to pick up and hold the sticks against the surface of the cylinder, the number of perforations being effective depending upon the lengths of the sticks supplied to the hopper.

Where relatively long, stick-like articles, such as macaroni or spaghetti, are fed to the hopper, suction applied through several perforations of a lengthwise row on the cylinder is effective to pick up and move the stick-like articles away from the discharge portion of the hopper 1. Where several of the lengthwise disposed perforations are effective upon a stick of macaroni, the stick is readily picked up and transferred; the longitudinal axis of the stick is thus held substantially parallel with the longitudinal surface or axis of the transferring cylinder 16. If the sticks in the hopper are out of parallelism with each other and with the cylinder axis, the suction effect applied through perforations adjacent a nearby portion of the stick is generally not sufficiently strong to pick up the stick and hold it against the surface of the cylinder. In the latter event, sticks are agitated to bring their long axes more nearly into parallelism with the longitudinal axis of the cylinder 16; this action may take place in several instances, the particular stick being agitated each time to eventually place it more closely into parallelism with the cylinder axis. When the stick is in substantial alignment with the cylinder surface or axis, it is acted upon by the suction effect created simultaneously through a series of apertures of a row, and is picked up and transferred toward the release point 21. Thus it will be seen that the rotating perforated cylinder tends to arrange elongate sticks of macaroni substantially in parallelism and to so transfer them. If the sticks are out of alignment to a sufficient extent they are not immediately picked up but are first agitated into alignment.

In addition to the tendency to arrange sticks into substantial alignment and transfer them toward the release location 21, the withdrawal of air from the interior of the cylinder also tends to remove from the adjacent mass of articles excess coatings of flour, which coatings are generally applied to the dough to minimize adhering together of the articles. The surface of the cylinder passes over adjacent articles and turns or rotates them during this movement to expose the article or material surfaces to the partial vacuum cleansing effect. The surface of the cylinder is shown in Fig. 1 in contact with the mass of articles 4 over a considerable portion of the area of the cylinder to thereby subject the articles to repeated agitation during movement of them upwardly toward and through the exit space 8.

While a plurality of round perforations or apertures is illustrated in Figs. 1 and 2, elongate apertures or slots 15, such as illustrated in Fig. 3, may be utilized. Where elongate openings or slots are utilized, several of them are preferably arranged in alignment longitudinally of the cylinder 16a, so that a vacuum or suction effect created by withdrawing air from the interior of the cylinder may be effective substantially along the length of sticks of macaroni placed in the hopper 1.

The sizes of the apertures or slots is not limited to the exact proportions shown. They may be of much smaller size; for example, they may comprise the relatively minute interstices existing in a piece of fabric that may be utilized to form an exterior covering over an appropriate cylindrically shaped supporting form.

At a release point or location 21, articles may be removed from the rotating cylinder 16 by a stripper plate or guide member 25 which has a leading edge closely adjacent the cylinder to positively or forcibly strip or "wipe" articles from the surface of the moving cylinder.

A connecting plate 26 may join the member 25 with the stop wall 13 to cover and thereby minimize or prevent drawing air into the cylinder through apertures which are momentarily intermediate the member 25 and the stop wall 13. There may also be utilized, in addition to the plate 26 or alone, a diaphragm or sealing plate 28 inside the cylinder 16 and substantially coextensive with the area intermediate the edge of member 25 and stop wall 13; this diaphragm seals off cylinder apertures 17 during their movement from the member 25 to stop wall 13. The leading edge of the diaphragm plate may project in advance of member 25 to cut off suction for releasing macaroni sticks without stripping them off. The members 26 and 28 may be of some flexible material, such as rubber, to thereby conform more closely to the surfaces of the cylinder 16.

Articles removed from the rotating cylinder 16 pass downwardly along the member 25, under the influence of gravity, toward a receptacle 29 of a measuring or dispensing device. In Fig. 1 the particular measuring device is shown comprising a weight-responsive means for weighing out definite predetermined quantities of macaroni, spaghetti or other materials.

A preferred form of weight-responsive mechanism comprises a receptacle 29 movably mounted on a pivot 31 carried adjacent the upper end of brackets 32, the brackets 32 being in turn carried by a scale beam or arm 34. The scale receptacle 29 and its connecting bracket 30 are normally maintained in the position illustrated in Fig. 1 by a spring 35 which presses at one end against the connecting bracket 30 and at the other end thereof against an adjustable member or screw 36 threadedly engaged with an internally threaded bracket 37 supported on the scale beam 34. The screw member 36 may be adjusted in the bracket 37 to vary the force or effect of the spring 35 upon the connecting bracket 30 and receptacle 29.

Upon deposition of a sufficient weight or quantity of articles into the receptacle 29, the spring 35 is compressed sufficiently to establish a contact between the normally spaced switch contact points 38; closing the contact points 38 of a microswitch, or other suitable switch, may establish an electrical circuit through wires operatively connected with a speed controller (not shown) for the motor 27. The microswitch or other switch contacts 38 are thus operatively connected with the motor 27 which is effective to rotate the cylinder 16 through the driving pulley 22; upon the closing of the contacts 38 the electric drive motor is slowed down to thus rotate the cylinder 16 at a lower rate and hence deliver a thinner or lesser quantity stream of articles to the release point 21. Thus articles are delivered more gradually or slowly to the receptacle 29. As articles are thus slowly delivered to the receptacle 29, the scale beam 34 continues to move downwardly more slowly until such time as the electrical contacts 40 shown adjacent the opposite end of the scale beam are closed.

Closing the second set of contacts 40 is effective to establish a circuit for closing a stream-interrupting door 41 and closing of the interrupting door in turn is effective to close a switch 39 for thereafter opening the receptacle door 42. An electrical time delay relay (not shown) preferably maintains the receptacle door 42 open for a sufficient period of time to allow the emptying of the receptacle 29, after which the receptacle door 42 closes. Subsequent to the closing of the receptacle door 42, the stream-interrupting door 41 is opened and sticks of macaroni or other articles which have accumulated on the guide plate 25 and stream-interrupting door 41 pass downwardly into the receptacle 29.

Upon emptying of a sufficient quantity of articles from the receptacle 29, the spring 35 opens the electrical contacts 38 of the microswitch; the electric drive motor 27 for the cylinder 16, which is operatively interconnected between the microswitch and the cylinder 16, speeds up to resume the normal rate of delivery of articles from the receptacle 1 to the release point 21.

The microswitch may, if desired, be positioned adjacent one side of the receptacle 29 and its brackets 30 instead of beneath the receptacle. Such a switch location is illustrated by the dot-dash lines immediately beneath the adjusting bolt 36.

In Figs. 4 and 5 there is illustrated a modified form of transferring cylinder 16b which may be utilized with the embodiment illustrated in Figs. 1 and 2 of the drawings. The cylinder illustrated in these two figures has a number of individual flat faces in lieu of the circular cross-section illustrated in Fig. 1. Each flat face 44 of the cylinder may be provided with apertures, perforations or slots such as described or illustrated in connection with Figs. 1, 2 and 3. The width of each flat side may, for example, be approximately equal to the diameter of a stick of macaroni and may have a single or a plurality of lengthwise rows of apertures for acting on a stick. The use of a cylinder with a plurality of flat faces may be preferred in certain instances as contributing toward an improved arranging and pickup of sticks.

It will be seen that the present invention provides a new and improved apparatus or device and a method for arranging, transferring and dispensing articles for packaging. The device and method are particularly adaptable to the arrangement, pickup and transfer of relatively long, slender, and fragile articles such as sticks of spaghetti, vermicelli or macaroni. Articles are arranged into substantially parallel relationship and so picked up and transferred toward and delivered to a measuring or weight responsive mechanism. The measuring or dispensing portion of the apparatus is operatively interconnected with the pickup and transfer mechanism in such manner as to vary the rate of movement or rotation of the article transferring means in response to the delivery of articles to the measuring means.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A device of the class described comprising a generally horizontal rotatably mounted cylinder having a plurality of perforations around its circumference and along its length, a hopper having a downwardly sloping stationary bottom portion extending beneath said cylinder and terminating in an end portion intermediate the lower end of said bottom portion and the cylinder for directing articles along the sloping portion to form a mass thereof between said bottom portion and the cylinder, a generally upright hopper end wall adjacent the cylinder and forming with said bottom portions a hopper mouth extending about one-quarter of the circumference around the lower part of the cylinder through which mouth the upper surface of said mass may press against the cylinder for agitation of articles and general alignment thereof along the horizontal axis of the cylinder during rotation of the cylinder, means for drawing air inwardly through said cylinder perforations, and means for preventing drawing air through perforations at about the other lower one-quarter of the cylinder circumference.

2. A device as claimed in claim 1 in which said cylinder has a plurality of substantially flat faces around its circumference and said perforations are provided only at said flat faces.

3. A device of the class described comprising a generally horizontal rotatably mounted cylinder having a plurality of perforations around its circumference and along its length, an electric motor for rotating said cylinder, a hopper having a downwardly sloping stationary bottom portion extending beneath said cylinder for directing articles toward and beneath the cylinder to form a mass thereof disposed largely beneath said cylinder, a generally upright hopper end wall adjacent the cylinder and forming with said bottom portion a hopper mouth extending around about one-quarter of the cylinder, means for drawing air inwardly through said perforations to agitate articles in said mass and to pick up and retain articles on the cylinder in general alignment with the horizontal axis thereof, and means to vary the speed of said motor and the rate of rotation of said cylinder over said article mass in response to articles delivered by the cylinder including a rotatably mounted receptacle for receiving and maintaining in alignment articles delivered by the cylinder, resilient means normally urging said receptacle in one direction but adapted yieldably in response to receipt of articles therein, and switch means connected with said motor to effect a speed change thereof and actuated in response to movement of the receptacle in opposition to said resilient means.

4. A device as claimed in claim 3, in which said receptacle, resilient means, and switch means are all carried by a movable scale beam.

5. A device as claimed in claim 3, in which means is provided for selectively varying the effect exerted by said resilient means.

ALDO R. CURIONI.

REFERENCES CITED

The following references are of record in the file of this patent:

UNITED STATES PATENTS

| Number | Name | Date |
|---|---|---|
| 410,116 | Richards | Aug. 27, 1889 |
| 1,001,562 | Smith | Aug. 22, 1911 |
| 1,409,642 | Ashwell | Mar. 14, 1922 |
| 1,422,600 | Molins | July 11, 1922 |
| 1,755,080 | Schunemann | Apr. 15, 1930 |
| 1,899,260 | Clements | Feb. 28, 1933 |
| 1,908,771 | Lied | May 16, 1933 |
| 2,071,443 | Weckerly | Feb. 23, 1937 |
| 2,093,437 | Givinn | Sept. 21, 1937 |
| 2,171,193 | Ruau | Aug. 29, 1939 |
| 2,249,369 | Williams | July 15, 1941 |

FOREIGN PATENTS

| Number | Country | Date |
|---|---|---|
| 362,702 | Great Britain | Dec. 10, 1931 |
| 392,102 | Great Britain | May 11, 1933 |
| 436,658 | Great Britain | Oct. 16, 1935 |